US012528114B2

(12) United States Patent
Bauersachs et al.

(10) Patent No.: US 12,528,114 B2
(45) Date of Patent: Jan. 20, 2026

(54) MULTI-PART MACHINE FRAME FOR A FORMING MACHINE

(71) Applicant: Langenstein & Schemann GmbH, Coburg (DE)

(72) Inventors: Lothar Bauersachs, Weidhausen (DE); Markus Otto, Lautertal (DE)

(73) Assignee: Langenstein & Schemann GmbH, Coburg (DE)

( * ) Notice: Subject to any disclaimer, the term of this patent is extended or adjusted under 35 U.S.C. 154(b) by 466 days.

(21) Appl. No.: 17/939,749

(22) Filed: Sep. 7, 2022

(65) Prior Publication Data

US 2023/0070810 A1 Mar. 9, 2023

(30) Foreign Application Priority Data

Sep. 7, 2021 (DE) ..................... 10 2021 123 126.4

(51) Int. Cl.

*B30B 15/04* (2006.01)
*B21J 7/02* (2006.01)
*B21J 13/04* (2006.01)

(52) U.S. Cl.

CPC ................. *B21J 13/04* (2013.01); *B21J 7/02* (2013.01); *B30B 15/04* (2013.01)

(58) Field of Classification Search

CPC ....... B30B 15/14; B30B 15/28; B30B 15/281; B30B 15/04; B30B 15/042; B30B 15/044;

(Continued)

(56) References Cited

U.S. PATENT DOCUMENTS 3,545,372 A * 12/1970 Mueller ................ B30B 15/048 425/384
3,643,592 A 2/1972 Blaser (Continued)

FOREIGN PATENT DOCUMENTS

CN 201872364 U 6/2011
CN 106984753 A 7/2017

(Continued)

OTHER PUBLICATIONS

Search Report received for Russian Patent Application No. 2022123828, mailed on Feb. 21, 2025, 4 pages (2 pages of English Translation and 2 pages of Original Document).

(Continued)

*Primary Examiner* — Jimmy T Nguyen
(74) *Attorney, Agent, or Firm* — Workman Nydegger

(57) ABSTRACT

Multi-part machine frame (12) for a, preferably percussive, forging machine, preferably a forging hammer (10), for forging workpieces, a) including at least two prefabricated frame parts (14, 15, 16) which are formed separately from each other, rest against each other in at least one or at least two support areas (65, 66) and are mutually supported and are pretensioned against each other with a set or adjustable pre-tension by way of pre-tensioning elements, preferably a wire rope, and are thereby pressed onto each other in the one or more support area(s) (65, 66) and/or are connected to one another in a force-fitting manner, b) in which in the support area or at least one or each of the at least two support areas (65, 66) between two frame parts at least two pairs of abutting support surfaces (45A and 55A, 45B and 55B, 46A and 56A, 46B and 56B) are formed, which are separated by free surfaces (45C and 55C, 46D and 56D) arranged therebetween, between which an intermediate space is formed, c) wherein the support area(s) or the at least two pairs of (Continued)

support surfaces in the associated support area(s) constitute or act as a positive and/or self-positioning connection.

14 Claims, 11 Drawing Sheets

(58) Field of Classification Search
CPC ........... B30B 15/045; B21J 13/04; B21J 7/02; B21B 31/02; B21D 37/10; F16M 1/00
USPC ........................................ 100/269.17; 72/455
See application file for complete search history.

(56) References Cited

U.S. PATENT DOCUMENTS

| | | | | |
|---|---|---|---|---|
| 4,116,039 | A | 9/1978 | Geuss | |
| 2011/0061437 | A1* | 3/2011 | Kapp | B30B 15/042 72/347 |
| 2012/0153244 | A1* | 6/2012 | Sczesny | B30B 15/042 254/199 |

FOREIGN PATENT DOCUMENTS

| | | | |
|---|---|---|---|
| CN | 111054882 | A | 4/2020 |
| DE | 1938279 | C | 11/1972 |
| DE | 2239147 | A1 | 2/1974 |
| DE | 2504695 | A1 | 8/1976 |
| DE | 2818511 | C2 | 6/1979 |
| DE | 102013108299 | B4 | 7/2016 |
| KR | 10-2010-0087499 | A | 8/2010 |
| SU | 372012 | A1 | 3/1973 |
| SU | 1000149 | A1 | 2/1983 |
| SU | 1053947 | A1 | 11/1983 |
| WO | 2015/014516 | A1 | 2/2015 |

OTHER PUBLICATIONS

Office Action received for Chinese Patent Application No. 202211087832.2, mailed on Oct. 17, 2025, 13 pages (7 pages of English Translation and 6 pages of Original Document).

* cited by examiner

MULTI-PART MACHINE FRAME FOR A FORMING MACHINE

CROSS-REFERENCE TO RELATED APPLICATIONS

The present invention claims the benefit of priority to German Patent Application No. 10 2021 123 126.4, filed on Sep. 7, 2021, the entire content which is incorporated herein by reference.

BACKGROUND OF THE INVENTION

1. Field of the Invention

The invention relates to a multi-part machine frame for a forming machine for forming workpieces, in particular for a, preferably percussive, forging machine, preferably a forging hammer, for forging workpieces. Furthermore, the invention relates to a forming machine for forming workpieces, in particular to a forging machine, preferably a forging hammer, for forging workpieces.

2. The Relevant Technology

The forging of workpieces made of metallic materials, for example iron, steel or aluminium materials, is usually carried out at relatively high temperatures. Forgeable materials basically include all kneadable metals and metal alloys. These can be ferrous materials and alloys such as cast iron or steels, as well as non-ferrous metals such as magnesium, aluminium, titanium, copper, nickel, vanadium and tungsten and alloys thereof.

The high forging temperatures achieve the required formability of the workpiece and flowability of the material. The temperatures that usually occur during forging are between 550° C. and 750° C. for semi-hot forming and above 900° C. for so-called hot forming, depending on the forged material.

In so-called cold forming at room temperature, the formability or flowability of the material required for forming is usually already present without heating, for example in the case of metallic sheets.

Various forming machines are known for forging solid metal forgings (solid forming), including percussive forming machines such as forging hammers and percussive forging presses such as screw presses. At least one ram with a first forming tool of the forming machine is driven by a drive and moved relative to a second forming tool of the forming machine, usually in a straight line towards and away from each other. Between the forming tools, the workpiece located in a working area is forged by applying forming forces and/or forming energy. Such forming machines usually operate cyclically. In die forging, shaping dies are used as forming tools into whose cavities or engravings the material of the workpiece flows.

The forming machine has a machine frame (or: machine chassis) which usually, especially in the case of a forging hammer or a forging press such as an arbor press, comprises a frame base (or: frame foundation) on which a lower forming tool is located and one or two or four uprights projecting or extending upwards from the frame base, on which the ram with the upper forming tool is guided. The frame base is also called an anvil bed (or: shabotte) in the case of a forging hammer and a press table in the case of a forging press. The frame may be in particular U-shaped or C-shaped, i.e. in the form of a frame open to one side, or also O-shaped, i.e. in the form of a closed frame. A head part, also called a traverse or crossbeam, is provided at the top of the uprights, which comprises the drive for the ram, for example a hydraulic and/or electric drive. The head part can be provided as a separate component or also integrated in the frame.

Lasco Umformtechnik GmbH has been producing and selling hydraulic forging hammers for many years, such as the hydraulic top pressure hammers Lasco HO-U (https://www.lasco.com/images/pdfs/prospekte/de/UT_Hydraulische_Schmiedehaemmer_2012_D.pdf) or the hydraulic counterblow hammers Lasco GH and also Lasco screw presses SPP or SPR.

The machine frame of the forming machine can be formed in one piece, i.e. frame base and upright and possibly also the head part are made of the same material and or in one continuous piece or integrally formed. Although the one-piece frame has a high strength, it also has the disadvantage that the production, transport and assembly of the large and heavy frame are costlier.

In another known embodiment, the machine frame of the forming machine is formed from several parts. Such a multi-part frame usually comprises the frame base as one frame part and the uprights as separate further frame parts and is thus, particularly in the case of larger forming machines, easier to manufacture in individual parts and can be transported to the installation site with less effort, the parts then being assembled on site to form the frame.

In a multi-part machine frame according to the state of the art, the uprights and the frame base are connected by means of tie rods loaded in tension and are pretensioned against each other in compression. The tie rods and their tension bias are provided to reduce lift-off between the individual frame parts during the forming process, as such lift-off leads to wear at the connection point. Tie rods are solid bolts or rods made of steel with a comparatively large cross-section, on the ends of which external threads are formed. Clamping nuts are screwed onto these external threads to pretension the bolts or rods, whereby the screw nuts then rest or are supported on mating surfaces or bearing surfaces on the parts to be bolted. The maximum tensile strength of the tie rods used in the forming machines is usually around 150 to a maximum of 500 $N/mm^2$. Spring elements are also frequently used to protect the tie rods from overload.

Wire ropes are described in various embodiments, for example in DIN EN 12385. A wire rope is usually formed from individual strands, in each of which a plurality of wires are twisted or intertwined in a helical arrangement, usually around a central core. The strands, each with several wires, are now often also twisted or helically intertwined with each other, usually around a central core and usually by so-called laying (laid rope) or, more rarely, by braiding (braided rope). Laid ropes allow the rope to be bent and redirected without breaking and are therefore also used, for example, in cable-ways. The direction of twist or the direction of rotation of the helical arrangement of the individual wires in the strands and the strands in the rope can now be the same, in particular in so-called equal lay ropes, or advantageously also be opposite, in particular in so-called counter lay ropes. In suspension ropes for suspension bridges, the wires or strands are often also guided parallel to each other and pressed together. The wires may be made by cold drawing and may be coated. Wires or strands of different diameters can be combined to form a rope. In addition to steel, other materials can also be incorporated into the wire rope, for example high-tensile plastic fibres or inserts or sheathing. The load-bearing capacity and tensile strength of wire ropes varies greatly and depends on the structure, rope diameter and the materials used. For example, the minimum breaking load of a wire rope is approximately equal to the product of the cross-sectional area of the rope determined by the outer diameter, the filling factor (which describes the filling of the entire cross-section by the individual strand cross-sections), the strength of the material, especially steel, and a stranding factor that depends on the construction of the rope. The tensile strength or tensile load capacity or maximum tensile stress of the wire rope then corresponds to the minimum breaking force divided by the cross-sectional area. The tensile or rope strength of the wire rope is somewhat lower than the sum of the tensile strengths of the individual strands and typically lies in a range of values around approx. 2000 $N/mm^2$.

From the publications DE 19 38 279 C and DE 22 39 147 A and DE 28 18 511 C2 and KR 10 2010 0087499 A and DE 10 2013 108 299 B4, multi-part machine frames with wire ropes for bracing individual machine frame parts are known for presses, but not for forging hammers.

BRIEF SUMMARY OF THE INVENTION

The invention is now based on the task of providing a new multi-part frame for a, preferably percussive, forging machine, preferably a forging hammer, for forging workpieces. The multi-part frame should preferably enable increased manufacturing accuracy during forging by precise movement and guidance of the ram and the forming tool located thereon.

This task is solved in particular by the machine frame (or: machine chassis) according to the claims.

The multi-part machine frame is provided in embodiments according to the invention for a, preferably percussive, forging machine, preferably a forging hammer, for forging workpieces and comprises at least two prefabricated frame parts which are formed separately from one another, which bear (or: rest, are in contact with) against one another in at least one support area or (at least two) support areas and are mutually supported and are prestressed against one another by means of pre-tensioning means with a set or adjustable prestress and are thereby pressed onto one another in the support area or areas and/or are connected to one another in a force-fitting manner.

The pre-tensioning means preferably comprise at least one wire rope (or: wire cable) or several wire ropes, but may also, alternatively or additionally, comprise at least one or several tie rods.

The multi-part design of the frame allows the combination of components made of different materials. For example, less stressed frame parts such as the uprights can be made of grey cast iron and more stressed frame parts such as a frame base or anvil beds can be made of cast steel. Finally, the separate design of the frame parts allows for easy transport and assembly.

In one embodiment according to the invention or according to claim 1, in at least one of the support areas between two frame parts (or: in which two frame parts are supported against each other) at least two pairs of abutting (or: contacting) support surfaces are formed, which are separated from each other by free surfaces arranged therebetween and an intermediate space (between the frame parts) formed or located between the free surfaces (the mutually opposing free surfaces of the two different frame parts). The at least one pre-tensioning means associated with these two frame parts, preferably at least one wire rope, preferably extends through the intermediate space and spaced from the pairs of support surfaces and/or passes between the two pairs of support surfaces.

In other words, according to one embodiment of the invention, in at least one of the support areas between two frame parts, at least two partial support areas (in at least one projection direction) are formed spaced apart from each other and the at least one pre-tensioning means associated with the two frame parts, preferably at least one wire rope, preferably runs between these partial support areas in a prestressing direction.

In embodiments according to the invention, it is provided that the or each support area or at least one of the support areas as a whole forms (or: effects, presents) a positive (or complementing, shape-locking), self-positioning (self-centering) and preferably non-self-locking connection or that the pairs of support surfaces in the associated support area form (or: effect, present) a positive, self-positioning and preferably non-self-locking connection, preferably a double wedge tension.

In an advantageous embodiment, the support surfaces are flat surfaces and preferably form at least part or partial surfaces of a regular or also irregular polyhedron, at least partially of a pyramid or a truncated pyramid, or also of a prism, in particular with a V-shaped cross-section or in the form of a saddle roof.

Advantageously, the support surfaces in a support area are complementary to each other, preferably a protruding or convex arrangement of support surfaces being opposite a receding or concave arrangement of support surfaces.

Furthermore, a fixation with a respective feather key can be provided at each support area.

In an advantageous embodiment, the pairs of support surfaces are each inclined upwards with respect to the horizontal.

In another advantageous embodiment, one pair of support surfaces is arranged horizontally and the other pair of support surfaces is inclined upwards with respect to the horizontal.

In a further embodiment, a third pair of support surfaces is provided, which is arranged in particular between the free surfaces or the intermediate space and another, preferably horizontally arranged, pair of support surfaces and is preferably aligned vertically. A free surface or an intermediate space can also be formed in at least one corner region or transition region of the third pair of support surfaces.

In a particularly advantageous embodiment, an outer pair of support surfaces is inclined at an outer angle of inclination to the pre-tensioning means or the direction of tensile force in the pre-tensioning means, in particular to the channel of the wire rope or to the direction of the tensile force in the wire rope and an inner pair of support surfaces is inclined at an inner angle of inclination to the pre-tensioning means or the direction of tensile force in the pre-tensioning means, in particular to the channel of the wire rope or to the direction of the tensile force in the wire rope. The force component acting as a contact force on the respective pair of support surfaces in the normal direction preferably corresponds in amount to the tensile force in the pre-tensioning means, in particular wire rope, multiplied by the factor cosine of 90° minus the corresponding angle of inclination. Preferably, the inner angle of inclination is selected to be equal to or greater than the outer angle of inclination and/or the inner angle of inclination is selected from the interval of 60° to 100° and the outer angle of inclination is selected from the interval of 30° to 90°.

In the preferred embodiments, the pairs of support surfaces or the partial support areas are disjoint from one another, i.e. topologically not connected to one another anywhere, but in a special embodiment they can also be connected to one another in the form of a circumferential or topologically annular support surfaces and thus enclose an intermediate space or free surfaces without support, for example in the form of a funnel or cone or pyramid or other rotationally symmetrical shape. The at least one pre-tensioning means, in particular wire rope, now preferably runs in or through the inner intermediate space, preferably at a uniform or varying angle of inclination to the support surfaces. In three-dimensional terms, only one circumferential or topologically annular pair of support surfaces is then provided. Nevertheless, also here in a two-dimensional projection or alternatively in a section two pairs of support surfaces are nevertheless provided, between which preferably the at least one pre-tensioning means runs or is arranged, which is why also such an embodiment is regarded as belonging to the invention.

In a preferred embodiment, the invention is based on the consideration of using high tensile strength wire ropes to connect the parts of the multi-part machine frame of the forging machine. Wire ropes for carrying high tensile stresses are known above all for suspension bridges and ropeways, as mentioned at the beginning, and are also standardized in DIN EN 12385. This preferred embodiment of the invention is based on the empirical knowledge and the knowledge gained through simulations that the connections by means of the proven tie rods as pre-tensioning means are only stable to a limited extent with multi-part frames and that when the hammer ram is struck, the uprights still lift slightly from the anvil bed. This has the disadvantage that the impact efficiency between striking and struck mass, i.e. between ram and frame, is unfavourably changed. Furthermore, the accuracy of the guidance of the ram in the frame is limited. In addition, this results in a certain amount of wear on the separating surfaces between the uprights and the anvil bed. However, an even stronger pre-tensioning fails due to the limited tensile load capacity of the tie rods with the available installation space.

However, wire ropes can be tensioned with a much higher tensile stress or, with the same cross-section, with a significantly higher tensile force than solid tie rods, so that the contact pressure on frame parts such as the anvil bed and uprights of the machine frame and thus the rigidity of the frame are significantly increased and consequently the formation of gaps on the support surfaces of the frame parts is usually even avoided altogether. The pre-tensioning with wire ropes enables, in other words, a particularly stable connection between the frame parts. The frame is so tightly pretensioned with the wire ropes that it practically behaves like a one-piece frame. This connection is stable enough that the frame parts do not lift off each other when a striking tool is struck. This ensures that the required impact efficiency is achieved. The wire ropes allow a very high tensile stress. The wire ropes ensure that the joints remain closed during the impact. In addition, only a relatively small installation space is required for tensioning by the wire ropes.

Another advantage of the use of wire ropes compared to tie rods is the significantly reduced assembly space for the installation of the bracing means, since the wire ropes can be inserted individually and in a curved shape in a space-saving manner, whereas at least twice the height of the frame assembly space under the crane hook is required for the installation and removal of the tie rods. Another advantage is that the wire ropes, in contrast to the tie rods, do not need to be secured against twisting, as they are insensitive to torsion and also vibrations. Furthermore, with the multi-part machine frame according to the invention, if desired, a cross connection between the uprights is no longer necessary.

Top and bottom are defined in the present application in the direction of gravity or earth's gravity.

In a preferred embodiment, the tensile stress in the or each wire rope is set to at least 600 $N/mm^2$ or at least 800 $N/mm^2$ or at least 1000 $N/mm^2$ and/or the tensile force in the or each wire rope is set between 2 MN and 15 MN and preferably between 7 MN and 12 MN.

The structure of the wire ropes is chosen in particular depending on the desired tensile strength, the available cross-section and the course of the guide channel in the frame. In an advantageous embodiment, each wire rope is formed according to the standard DIN EN 12385 and/or each wire rope comprises a predetermined number, in particular 3 to 80, of strands which are preferably twisted together, in particular around a central core and/or in a helical form, for example with a pitch angle between 10° and 20°. The strands are preferably formed in accordance with the EN 10138-3 standard and/or comprise several, in particular 3 to 245, preferably 7 to 19, individual wires, the wires preferably being twisted, in particular around a central core of the strand.

In a particularly advantageous embodiment, at least one or each wire rope is guided in a continuous channel in the machine frame. Preferably, at least one continuous channel and the wire rope guided therein runs through only two frame parts. Alternatively or additionally, preferably at least one continuous channel and the wire rope guided therein runs through three frame parts.

The frame parts preferably each have at least one subchannel, wherein at least one subchannel of a frame part is connected to at least one subchannel of one of the other frame parts and the continuous channel for the wire rope is formed from the interconnected subchannels.

In one embodiment, a subchannel, in particular U-shaped or curved, in a frame part is connected at its two ends to a respective subchannel of a respective further frame part and forms with these two subchannels a continuous channel for a wire rope and preferably runs partially below a recess for a forming tool.

In a further embodiment, the continuous channels or subchannels of two different wire ropes may cross each other within a frame part, preferably partially below a recess for a forming tool, and/or run from one side of the frame to an opposite side of the frame.

In particular, the subchannels can be arranged in a straight line to each other or form a straight continuous channel and/or run vertically or inclined to the vertical.

In one embodiment, a frame base and at least one, two or four separately formed uprights, preferably extending substantially upwards from the frame base, are provided as separate frame parts.

An inner channel, in particular a U-shaped channel, in the base of the frame can now be connected at its two ends to an inner channel in each of one or two uprights and form a continuous channel, and the ends of the wire rope guided in this continuous channel can each lie on or in the upright(s).

Furthermore, at least two inner channels in the frame base can form a continuous channel with an inner channel in one or two uprights and optionally in a crossbeam, and the ends of the wire rope guided in this continuous channel can each be located at or in the frame base.

In a preferred embodiment, the pretension of the frame parts against each other in the support area results in amount and direction from the tensile stress in the associated at least one wire rope and its course or the course of the interconnected channel and the resulting vertical and horizontal tensile stress components. Preferably, the ratio of the horizontal tensile stress component and the vertical tensile stress component in the wire rope over its course is in a range of 0 to 80% and in the support area preferably between 0% and 50%.

In a further embodiment, at least one wire rope or the continuous channel for the wire rope extends substantially vertically or at an angle or oblique to the vertical, at least in the support area.

Pre-tensioning means comprising at least one tensioning device at each wire rope, in particular its rope end, for tensioning and generating the tensile stress in the wire rope are particularly expedient, preferably one tensioning device at each end of each wire rope. The tensioning device can enclose the associated wire rope and preferably be clamped, locked or brought into force-fitting contact with the frame part at the corresponding end of the continuous channel. Preferably, an outwardly open receiving space is provided in the frame part for receiving the wire rope end and the associated tensioning device.

At least one tensioning device preferably comprises an anchor block and a plurality of clamping jaws, wherein the clamping jaws are preferably formed as conical sleeves and each enclose a strand of the wire rope, and wherein preferably the anchor block comprises a plurality of parallel conical bores for receiving the clamping jaws. The tensioning device may also have a press-fit socket with a wide end and a narrow end, wherein the narrow end of the press-fit socket is arranged towards the channel and the wide end of the press-fit socket is in force-fitting contact with the anchor block, and wherein preferably the press-fit socket has transverse ribs which surround the press-fit socket in the circumferential direction.

A forming machine for forming workpieces, in particular a forging machine, preferably a forging hammer, for forging workpieces, comprises in one embodiment a multi-part machine frame according to the invention and a tool carrier guided on at least one frame part, in particular upright, of the machine frame and movable towards or away from the frame base, in particular a ram, on which at least one first forming tool is arranged, and at least one second forming tool arranged on a further frame part, in particular a frame base or an anvil bed, preferably on an anvil or insert block arranged on a recess of the frame base.

The forming machine may also have at least one crossbeam connecting the uprights on a side away from the base of the frame, at least one drive for the ram being provided on the crossbeam.

Preferably, each support area between the frame base and the upright(s) is located above at least the support area or mounting wedges of the anvil or insert block, preferably above the entire anvil.

The or one of the upwardly inclined pair(s) with respect to the horizontal is/are arranged by support surfaces on an inner side of the frame facing the second forming tool.

DESCRIPTION OF THE DRAWINGS

The invention is further described below by means of examples of embodiments and with reference to the drawings. They show in each case in a schematic representation.

Corresponding parts and sizes are marked with the same reference signs in FIGS. 1 to 11.

DETAILED DESCRIPTION OF THE PREFERRED EMBODIMENTS

In the embodiments, the forming machine 10 for forging metallic, generally solid, workpieces is disclosed as a forging hammer.

However, a multi-part machine frame according to the invention is not limited to use in a forging hammer, but can also be used for other forming machines, in particular forging machines, for example hydraulic press machines or electromotive presses such as screw presses or linear drive presses or electric upsetting machines or also rolling machines, but in principle also for sand-lime brick presses.

Figure 1:
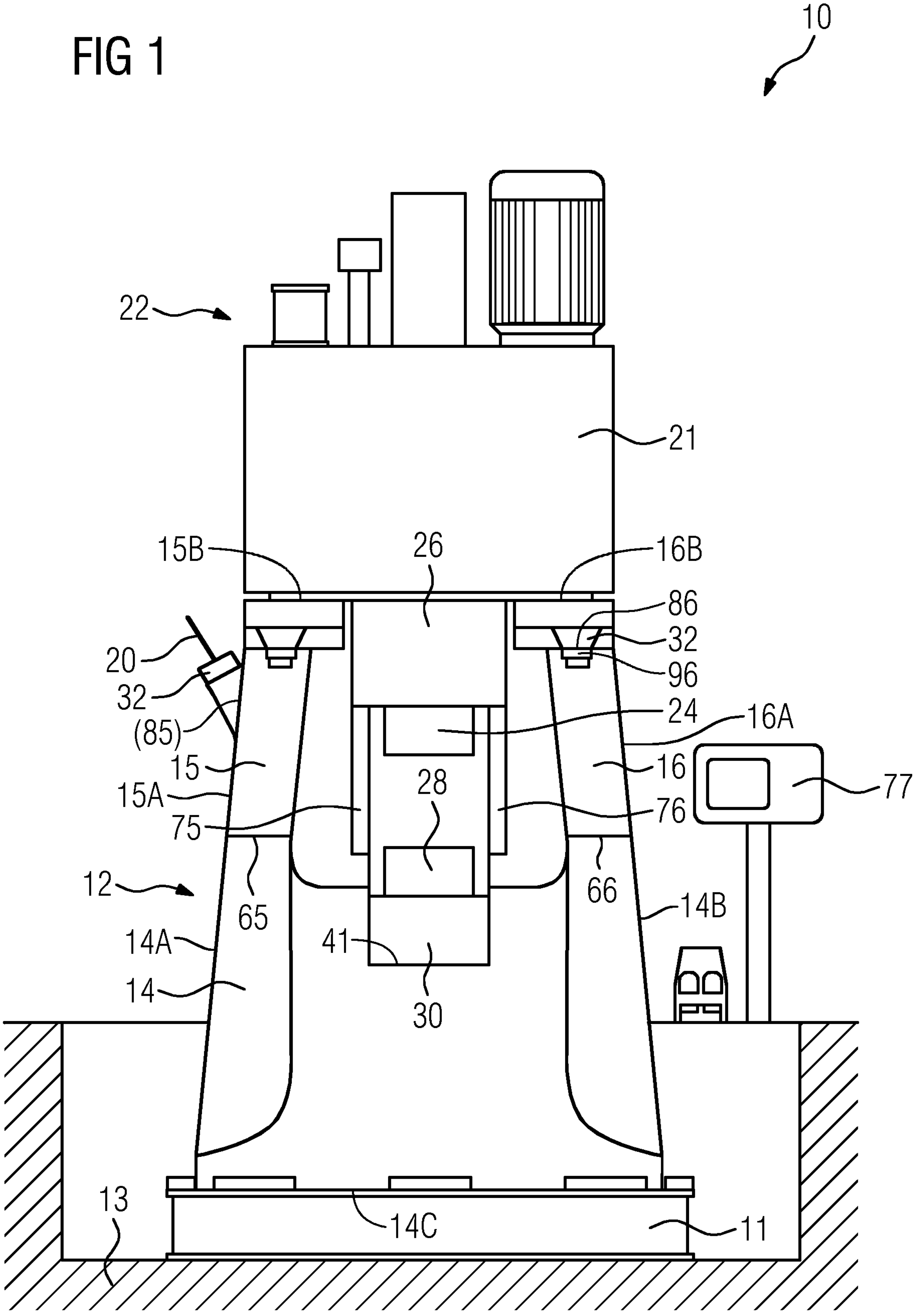
FIG. 1 a forging hammer as a forming machine with a multi-part frame according to a first embodiment of the invention in a front view, FIG. 2 the frame for the forging hammer according to FIG. 1 in a perspective view, FIG. 3 the frame according to FIG. 2 in a partial sectional view, FIG. 4 a frame for a forging hammer according to a second embodiment of the invention in a partial sectional view, FIG. 5 a tensioning device for a wire rope for a rack according to the invention in a sectional view, FIG. 6 a frame for a forging hammer according to a third embodiment of the invention in a partial sectional view, FIG. 7 a frame for a forging hammer according to a fourth embodiment of the invention in a perspective view, FIG. 8 a frame for a forging hammer according to a fifth embodiment of the invention in a partial sectional view, FIG. 9 a frame for a forging hammer according to a sixth embodiment of the invention in a perspective view, FIG. 10 an embodiment of a support area between an upright and an anvil bed of a forging hammer according to the invention in a front view and FIG. 11 another embodiment of a support area between an upright and an anvil bed of a forging hammer according to the invention in a front view.

In the embodiments shown, the forging hammer as a forming machine 10, as shown for example in FIG. 1, comprises a multi-part frame (or: machine chassis) 12, a crossbeam (or: machine head, head piece) 21 above the frame 12, a ram 26 (or in general: a first tool carrier) guided on the frame 12, and an anvil (or: insert block) 30 (or in general: second tool carrier) arranged on the frame 12, here fastened in a recess 41 in the frame 12, in particular wedged by means of wedges not shown.

An upper forming tool (or: die) 24 is attached to the ram 26. The ram 26 with the upper forming tool 24 is movable up and down by a drive system 22 provided on the crossbeam 21. The drive system 22 may in particular be a hydraulic and/or electric motor drive system.

A lower forming tool 28 is attached to the anvil 30. The forming tools 24 and 28 are adapted to the desired shape of the metallic workpiece, which is formed or forged by the impacting forming action during the downward movement of the ram 26 between the forming tools 24 and 28. An operating device of a control system 77 is shown to the side of the frame 12.

Figure 2:
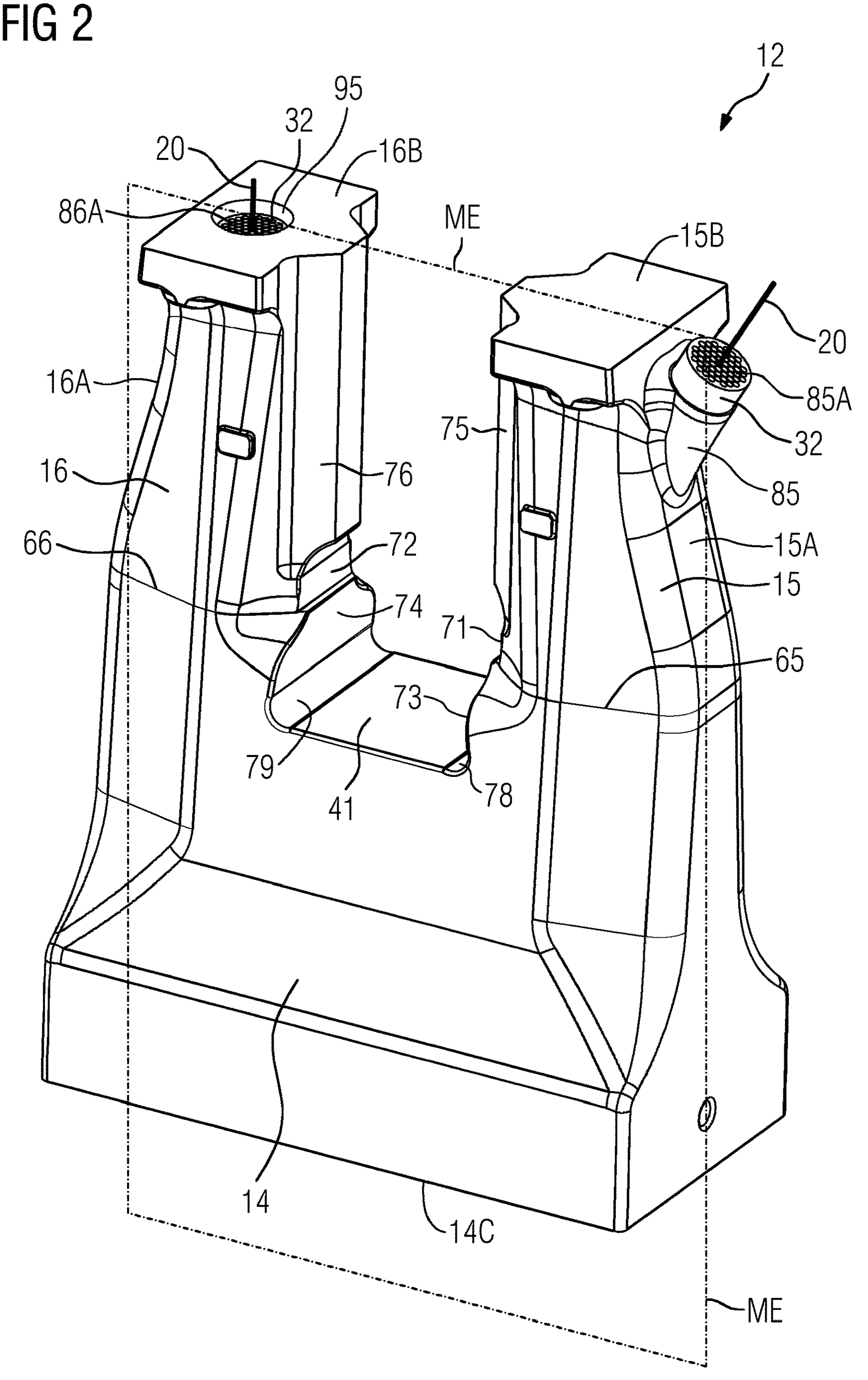
Figure 3:
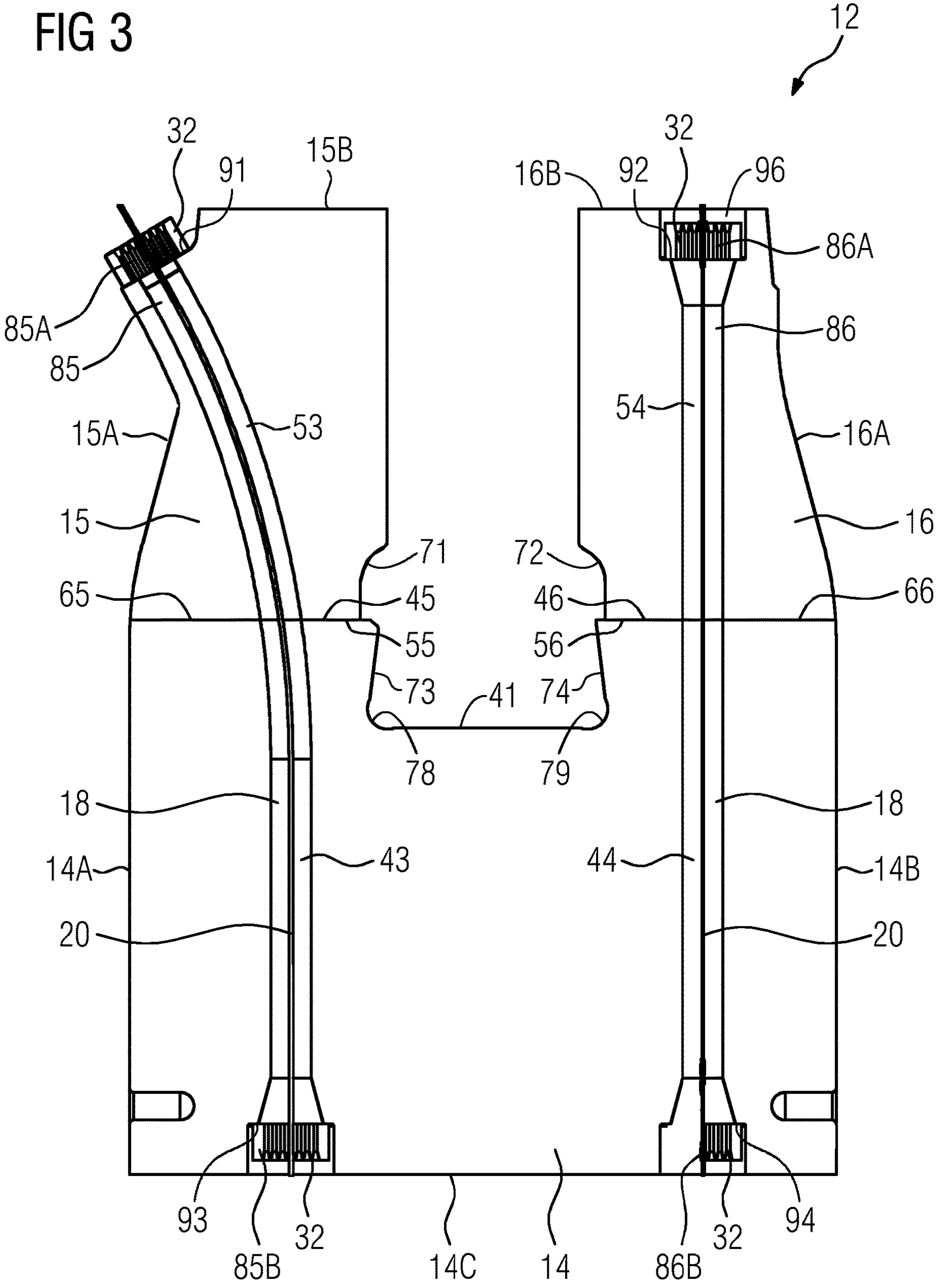
Figure 4:
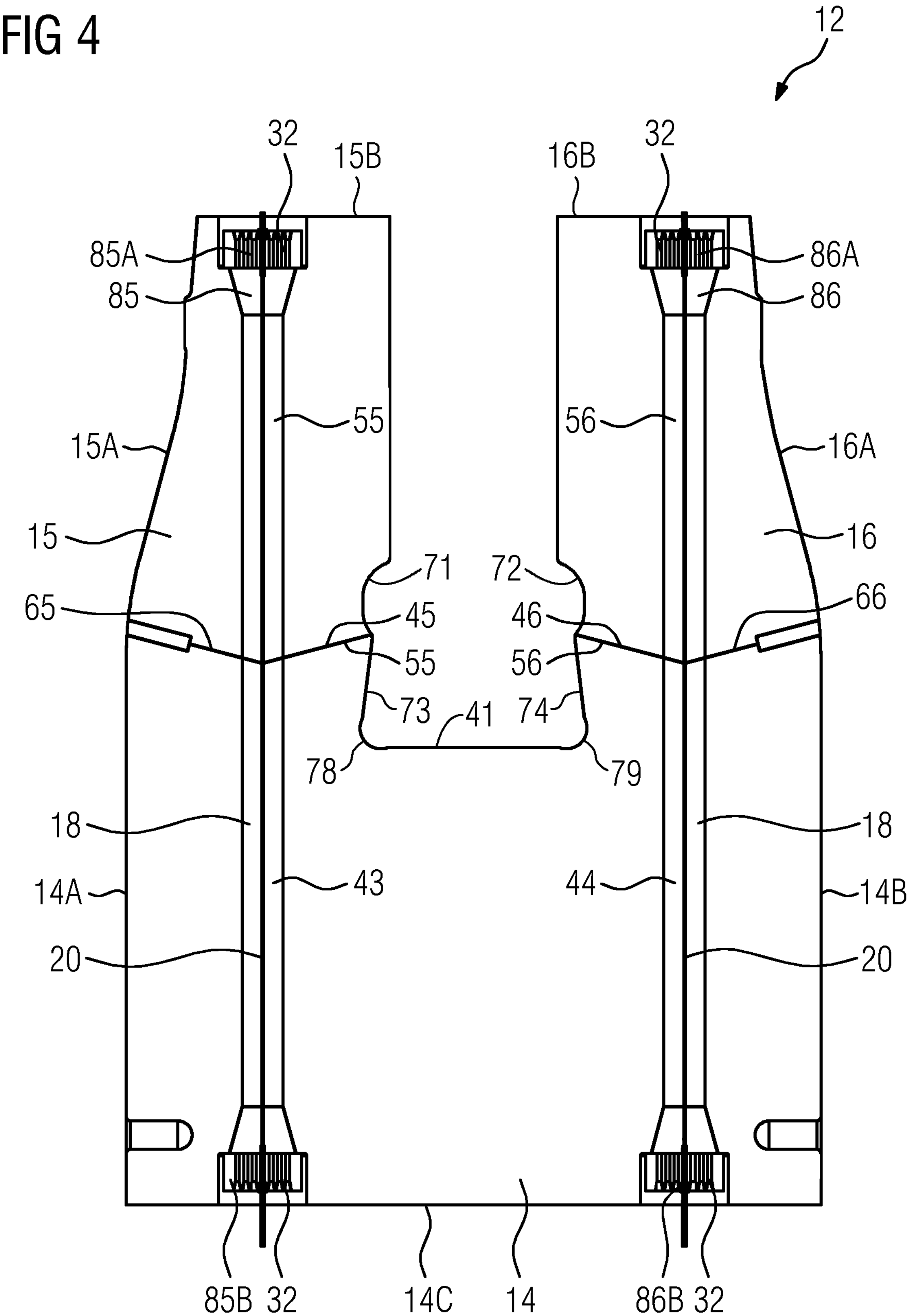

Examples of embodiments of the frame 12 of the forging hammer according to FIG. 1 are also shown in more detail in FIGS. 2 to 4.

The frame 12 comprises a number of frame parts, in particular an anvil bed 14 as the first frame part and two uprights 15 and 16 as further frame parts. Preferably, the frame 12, in particular the anvil bed 14, stands on a base 11 which is anchored in a foundation 13. If necessary, an additional anvil bed, not shown, could also be provided, which could, for example, be cast in highly dynamic concrete.

The anvil bed 14 and the two uprights 15 and 16 are formed as separate components. The uprights 15 and 16 are supported in associated support areas (or: connecting areas, parting planes) 65 and 66 on the anvil bed 14. The separate design of these components and the corresponding multi-part nature of the frame 12 allow for modular construction and also the combination of different materials. For example, the anvil bed 14, which must withstand greater forming forces and stresses, may be formed of cast steel or high-strength steel, and the uprights 15 and 16, which must withstand low stresses during forming, may also be formed of grey cast iron. Furthermore, the separate construction of the components allows for easier transport and assembly than with a one-piece frame.

Outer surfaces or upright side surfaces of uprights 15 and 16 are designated 15A and 16A, respectively, upper surfaces or upright top surfaces are designated 15B and 16B, respectively, and outer chamfer side surfaces of chamfer 14 are designated 14A and 14B, respectively, and a chamfer bottom surface is designated 14C.

In a further embodiment according to the invention, as can be seen in particular in FIG. 1, the connection or support areas 65 and 66 between the anvil bed 14 and the uprights 15 and 16 are preferably arranged above at least the support area or the fastening wedges of the anvil (or: insert block) 30, preferably above the entire anvil 30. As a result, the uprights 15 and 16 have no (direct) contact with the anvil 30 and displacement of the uprights 15 and 16, especially in the horizontal direction, is greatly reduced or even completely avoided.

In the support area 65, one or more support surfaces 55 of the upright 15 rest on corresponding support surfaces 45 of the anvil bed 14 directly or if necessary: also indirectly via intermediate elements or discs. In the support area 66, one or more support surfaces 56 of the upright 16 rest on corresponding support surfaces 46 of the anvil bed 14 directly or, where appropriate: also indirectly via intermediate elements or discs, as described in more detail in particular in FIGS. 3 and 4 and 6 to 11. The support surfaces 55 and 56 of the uprights 15 and 16 are preferably adapted to the shape of the adjacent support surfaces 45 and 46 of the anvil bed 14, i.e. they form complementary or mutually adapted contact surfaces.

In embodiments such as those shown in FIGS. 1 to 3, the support surfaces 45 and 55 or 46 and 56 are each flat and preferably arranged horizontally or in at least one horizontal plane so that, unlike in the case of inclined surfaces, no force component parallel to the force of gravity is effective at the support areas which could cause the uprights 15 and 16 to slide or slip.

The embodiments shown in FIGS. 2 and 3 can also be modified to advantageous embodiments in which both wire ropes and their associated channels and support areas are arranged equally or symmetrically with respect to each other, i.e. both wire ropes 85 and 86 curved outwards like the wire rope 85 in FIGS. 2 and 3 or both wire ropes 85 and 86 vertically and straight like the wire rope 86 in FIGS. 2 and 3 (see also FIG. 4).

Figure 10:
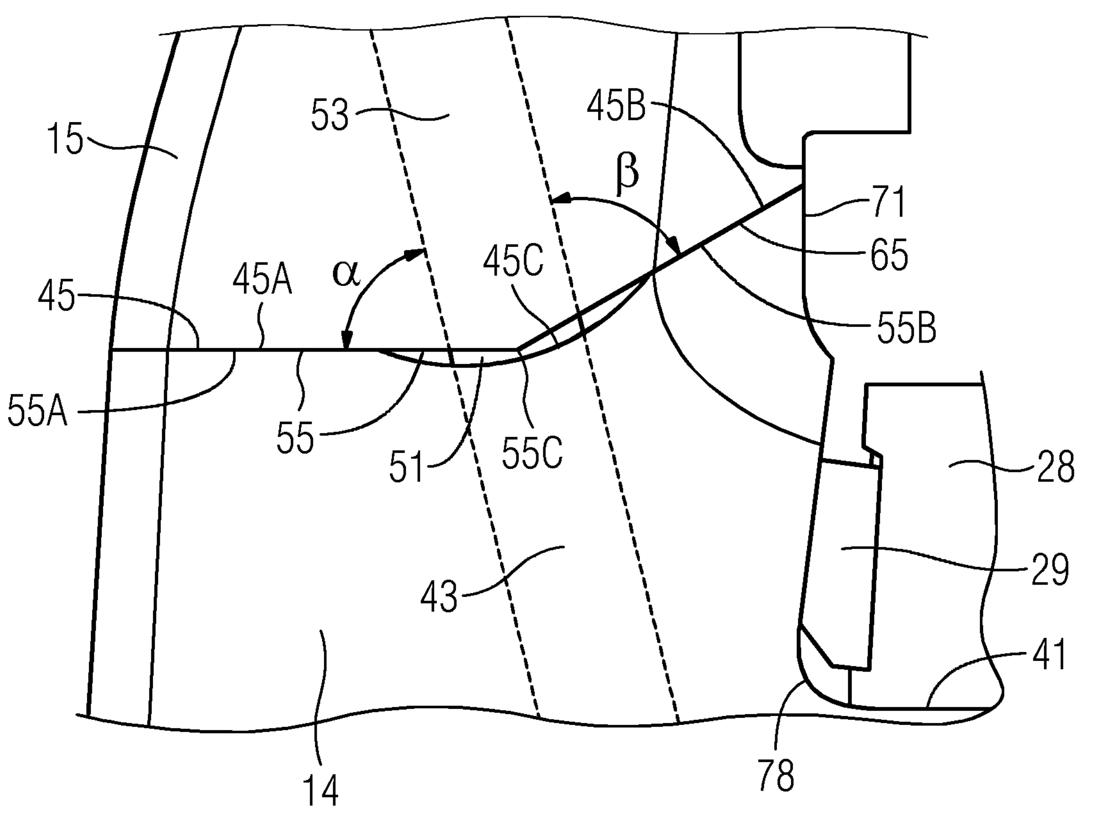
Figure 11:
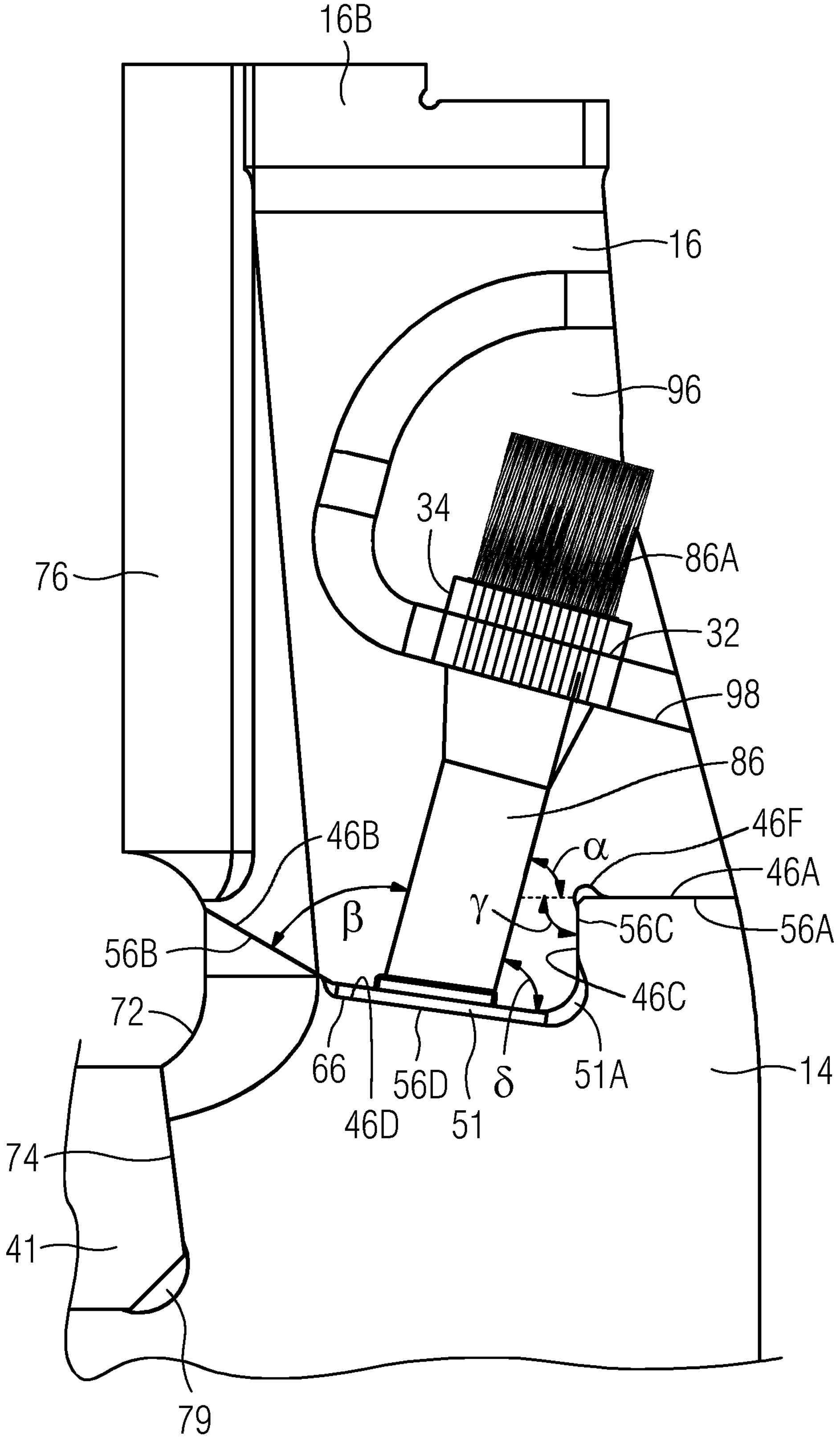

In further, independent further embodiments according to the invention, which can be seen in particular in the embodiment examples according to FIG. 4 and in FIGS. 10 and 11, the connecting or support areas 65 and 66 between the anvil bed 14 and the uprights 15 and 16 are at least partially formed with support surfaces 45 and 55 or 46 and 56, respectively, which are inclined or inclined with respect to the vertical or gravity, allow the uprights 15 and 16 to be self-positioned or centred on the anvil bed 14 by form-fitting locking and are preferably not self-locking. In this embodiment, the support surfaces 45 and 55 or 46 and 56 are also preferably flat surfaces and preferably form at least part of a regular or also irregular polyhedron, at least part of a pyramid or a truncated pyramid, or also of a prism, for example continuous with a downwardly tapering or upside-down V-shaped cross-section (saddle-roof-shaped) or also already with only two slopes, i.e. a double wedge clamping. However, other surface shapes are also possible at the support areas 65 and 66 which allow a form-fitting connection, for example curved support surfaces such as spherical surfaces or oval surfaces or conical or frustoconical ones. The support surfaces 45 and 55 and the support surfaces 46 and 56 preferably form complementary surfaces so that they can be in direct contact with each other, wherein a protruding, in particular convex, support surface can correspond to or be opposite a receding, in particular concave, support surface. The receding support surface, which receives the protruding support surface, is normally the lower support surface in the direction of the force of gravity, in order to allow stable bearing and centring.

Due to this form-fitting design of the support surfaces 45 and 55 in the support area 65 or 46 and 56 in the support area 66, a self-alignment and self-positioning or self-centring and support of the uprights 15 and 16 relative to the anvil bed 14 is achieved and no additional displacement device is required to align the position of the uprights 15 and 16. Furthermore, due to the form-fitting connection, even with only two bevels, i.e. a double wedge clamping, a fixation with one feather key 67 each at the support area 65 or 66 is sufficient.

A combined embodiment may also be chosen in which one portion of the support surfaces is horizontal and another portion is inclined to the vertical, as shown for example in FIG. 10 and explained in further detail.

Furthermore, in a further embodiment, in addition to horizontal or level and/or inclined support (sub)surfaces, a pair of support surfaces or of sub-regions of support surfaces may be oriented vertically or nearly vertically, i.e. parallel to gravity, in order to completely prevent lateral movement or movement with a horizontal component of the frame parts against each other in this direction, as shown for example in FIG. 11 and explained in further detail. Such lateral movement may in particular occur due to lateral deformation resulting from eccentric loads on the forming tools.

Preferably, in the support area, in particular 65 and 66, there is a free surface between two pairs of support surfaces or support sub-surfaces, in which the two frame parts do not abut each other or are spaced apart from each other by an intermediate space or gap.

Due to the reaction forces during the forming process in forming machines, in particular during the impacting (massive) forming of a forging hammer or other impacting forming machines such as screw presses, the frame parts can briefly lift off from each other, in particular the uprights from the scraper, or gaps can briefly form in the dynamic behaviour at the support areas. The contact times considered here during forming are in the range of tenths of microseconds, e.g. 0.3 ms.

In order to counteract this, the frame parts, in particular the anvil bed 14 and the two uprights 15 and 16, are placed under a pre-tension at the associated support areas 65 and 66 respectively by means of pre-tensioning devices (or: pre-tensioning means), so that this tensile stress in the pre-tensioning devices in turn generates a contact pressure at the support surfaces 45 and 55 or 46 and 56 and thus a force-fitting connection between the frame parts in the support areas 65 and 66.

For this purpose, the values of the forces or stresses/pressures (forces per unit area) to be expected at the support areas 65 or 66 as well as the deformations are preferably determined empirically or by means of a computational simulation, and the contact pressure or contact force is set higher than these expected values by means of the pretension or tensile forces in the pre-tensioning devices in order to prevent or at least greatly reduce gap formation or lift-off. Physically, kinematic forces or acceleration forces are generated that at least approximately correspond to the product of the mass and the acceleration of the ram. The acceleration forces briefly create (without preloading devices in the simulation or empirical investigation) a deformation of the lower tool carrier and the upper tool carrier away from each other. For example, if accelerations of the hammer ram of, say, 1000 $m/s^2$ occur during impact in a forging hammer, then acceleration forces of 6 MN or tensile stresses directed away from the other part of the frame corresponding to the forces divided by the transmission cross-sectional area of 6 MPa (1 Pa=1 $N/m^2$) occur in a hammer ram with a mass of 6000 kg, then 9 MN or 9 MPa in a mass of 9000 kg, which must then be compensated by means of the pre-tensioning devices.

Therefore, the pre-tensioning force or the pretension (tensile force per area) of the pre-tensioning devices is set higher than these acceleration forces or the corresponding dynamic stresses by a safety margin of typically at least 10%, preferably at least 20%, e.g. higher than 6 MN or 6 MPa in the first case example and higher than 9 MN or 9 MPa in the second case.

According to the preferred embodiments according to the invention, the pre-tensioning devices used to generate this pre-tensioning are no longer the tie rods used in the prior art, but wire ropes that can be loaded with a higher tensile stress. For the same cross-sectional area, the adjustable tensile force of wire ropes is typically four times as high as that of tie rods.

The construction of the wire ropes is chosen in particular depending on the desired tensile strength, the available cross-section and the course of the guide channel in the frame, preferably within the framework of DIN EN 12385.

The load-bearing capacity and tensile strength of wire ropes depend on the structure, rope diameter and the materials used. Thus, the minimum breaking load of a wire rope is approximately equal to the product of the nominal cross-sectional area of the rope determined by the outer diameter, the filling factor, the strength of the material, especially steel, and the stranding factor. The tensile strength or tensile load capacity or maximum tensile stress of the wire rope is then the minimum breaking force divided by the cross-sectional area.

A wire rope generally comprises a predetermined number, for example 3 to 80, of strands, which also determine the nominal cross-sectional area and tensile strength of the wire rope. The strands are preferably twisted together, in particular around a central core and/or in a helical shape, for example with a pitch angle between 10° and 20°.

The strands may in particular be formed in accordance with standard EN 10138-3. Each strand may comprise several, for example 3 to 245, in particular 7 to 19, individual wires, the wires preferably being twisted, in particular around a central insert of the strand.

Typically, the wire ropes are pretensioned to tensile forces between 2 MN and 15 MN and preferably between 7 MN and 12 MN.

E.g. a wire rope with the designation 31C15 has a number of 31 strands and a nominal cross-sectional area of typically 4650 $mm^2$ and a maximum tensile force of 8.215 MN and a wire rope 37C15 with 37 strands allows a tensile force of 10 MN corresponding to a tensile stress of 752 MPa=752 $MN/m^2$=752 $N/mm^2$ for a diameter of 130 mm (for comparison: A solid tie rod requires a diameter of 254 mm corresponding to a tensile stress of 196 MPa=196 $MN/m^2$=196 $N/mm^2$) for a pre-tensioning force of 10 MN.

A wire rope of 55 strands with a strand diameter of 15.7 mm and a yield strength of the individual strands of 1770 $N/mm^2$ bears a tensile stress in the entire wire rope of 1090 $N/mm^2$, which is far beyond the tensile stresses possible in tie rods, when a tensile force of 9 MN is applied.

With the high tensile stresses that can be set with wire ropes, i.e. tensile force per surface area, which would not be possible with tie rods, the gaps that occur at the connection interfaces, i.e. the support areas 65 and 66, during impact forming in the frame 12 can also be reliably avoided. This increases the positional and movement accuracy of the upper forming tool 24 relative to the lower forming tool 28.

By means of the wire ropes it is now possible, especially by means of referenced simulation, to create a connection that remains closed during the impact. The problem observed when using drop-in anchors, namely that the multi-part frames of forging hammers opened up in the parting plane or the uprights lost contact with the anvil bed for a short time, which could also be determined on the basis of deposits in the joint, can now be avoided.

Ideally, only one continuous wire rope is used per support area 65 and 66, but two or more wire ropes may be arranged in parallel and pre-tensioned at a support area 65 or 66. In the FIGS., one wire rope 85 and 86 are shown for each upright 15 and 16, but two or more wire ropes may be provided for one or both uprights 15 and 16.

Each wire rope 85 and 86 is guided through and tensioned in a channel in the frame. The internal cross-sections of the channels are adapted to the external cross-sections of the wire ropes and are slightly larger, typically up to a maximum of 5%, to allow threading.

In particular, each wire rope 85 and 86 is pulled through an associated inner channel 43 and 44 respectively in the anvil bed 14 and through an inner channel 53 and 54 respectively of the associated upright 15 and 16 respectively. The channels 43 and 53 and 44 and 54, which are placed or joined together with their mouths or ends, each form a continuous channel 18 for the respective wire rope 85 or 86. One channel 18 penetrates one upright 15 and the anvil bed 14 and another channel 18 penetrates the other upright 16 and the anvil bed 14.

The channel 18 and thus the wire rope 85 or 86 guided therein may extend vertically, as shown in FIG. 3 for the wire rope 86 and shown in FIG. 4 for both wire ropes 85 and 86, so that the acting tensile stress is directed substantially parallel to the force of gravity. However, the channel 18 with the wire rope guided therein can also, as shown in FIG. 4 in the case of wire rope 85, run along a line that is curved or bent, preferably outwards, at least in the inner channel in the stator. As a result, the tensile stress acting in the upright, here 85, and preferably also in the support area 65, in the wire rope and thus from upright against anvil bed, has a vertical component and a horizontal component, in particular an outwardly directed horizontal component. Thus, in the support area, the upright is pressed downwards and also sideways, preferably outwards, against the anvil bed 14. The wire rope 85 and the channel 18 thus run in the support area at an angle α to the horizontal.

The ratio of the horizontal component to the vertical component of the tensile stress in the wire rope can vary over the course or length of the wire rope, especially in the case of a curved or bent course, and lies in particular in the support range in an interval of 0 to 0.5.

Figure 6:
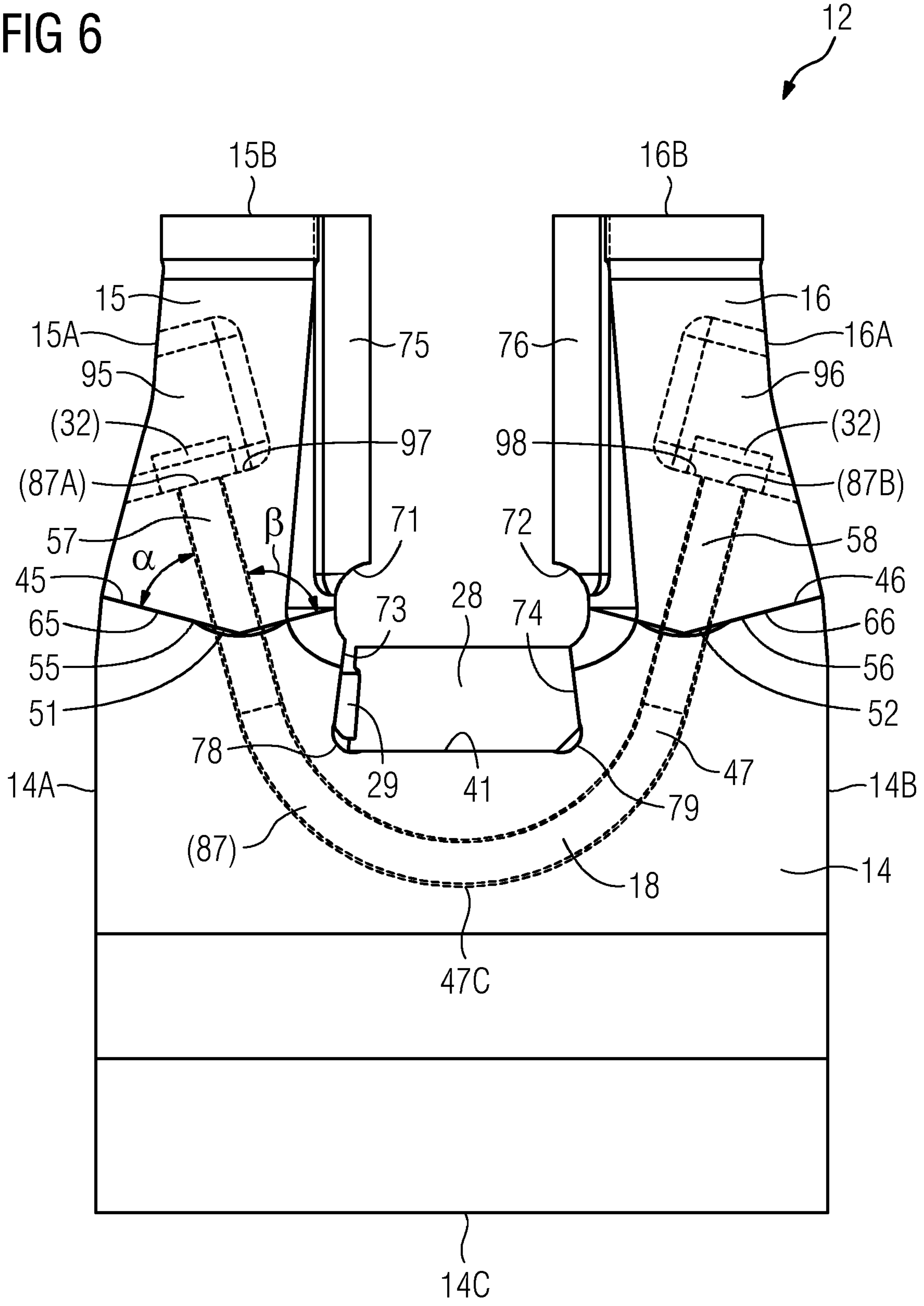

Alternatively, as shown in FIG. 6, the frame 12 may have a continuous channel 18 which extends in a U-shape from the top of one upright 15 first downwards, then, in particular in an arc, through the anvil bed 14 and finally upwards again through the other upright 16. A wire cable then runs through the channel, which is provided with a tensioning device 32 at one end on the upright 15 and is provided with a further tensioning device 32 at the other end on the upright 16. In addition, a wire cable running over the crossbeam 21 between the uprights 15 and 16 or even a U-shaped or arched upright would also be conceivable, although not the first choice due to the loss of installation space for the drive.

At the rope ends 85A and 85B of the wire rope 85 as well as at the rope ends 86A and 86B of the wire rope 86 there is in each case a tensioning device 32 which encloses the associated wire rope 85 or 86 and which is clamped and locked at the corresponding end of the channel 18 or brought into force-locking contact with the upright 15 or 16 as well as with the anvil bed 14.

In this example, one tensioning device 32 is located outside the curved channel 18 at its end, while the three remaining tensioning devices 32 are recessed in funnel-shaped ends of the channels 18. However, all upper tensioning devices 32 may also be recessed in funnel-shaped ends of the respective channel 18.

Furthermore, in all embodiments as shown in FIGS. 6 to 11, the upper tensioning devices and the upper rope ends may also be arranged in receiving spaces 95 and 96 formed inwardly in the uprights 15 and 16 and preferably open towards the upright side surface 15A and 16A, respectively, and be placed and tensioned on base surfaces 97 and 98, respectively, of the receiving spaces 95 and 96 in which the respective channels for the wire rope open.

The lower tensioning devices 32 are recessed in the lower funnel-shaped ends of the channels 18, preferably on the underside of the anvil bed 14. With the tensioning devices 32, the wire rope 85 or 86 is pre-tensioned to the desired tensile stress.

Preferably, known tensioning devices 32 with single strand tensioning are used, as they are well suited for limited installation space and also for vertical installation or assembly of the frame. Hydraulic strand jacks are particularly advantageous here, which can also be actuated in several smaller strokes up to an entire pre-tensioning stroke of, for example, several centimetres.

Figure 5:
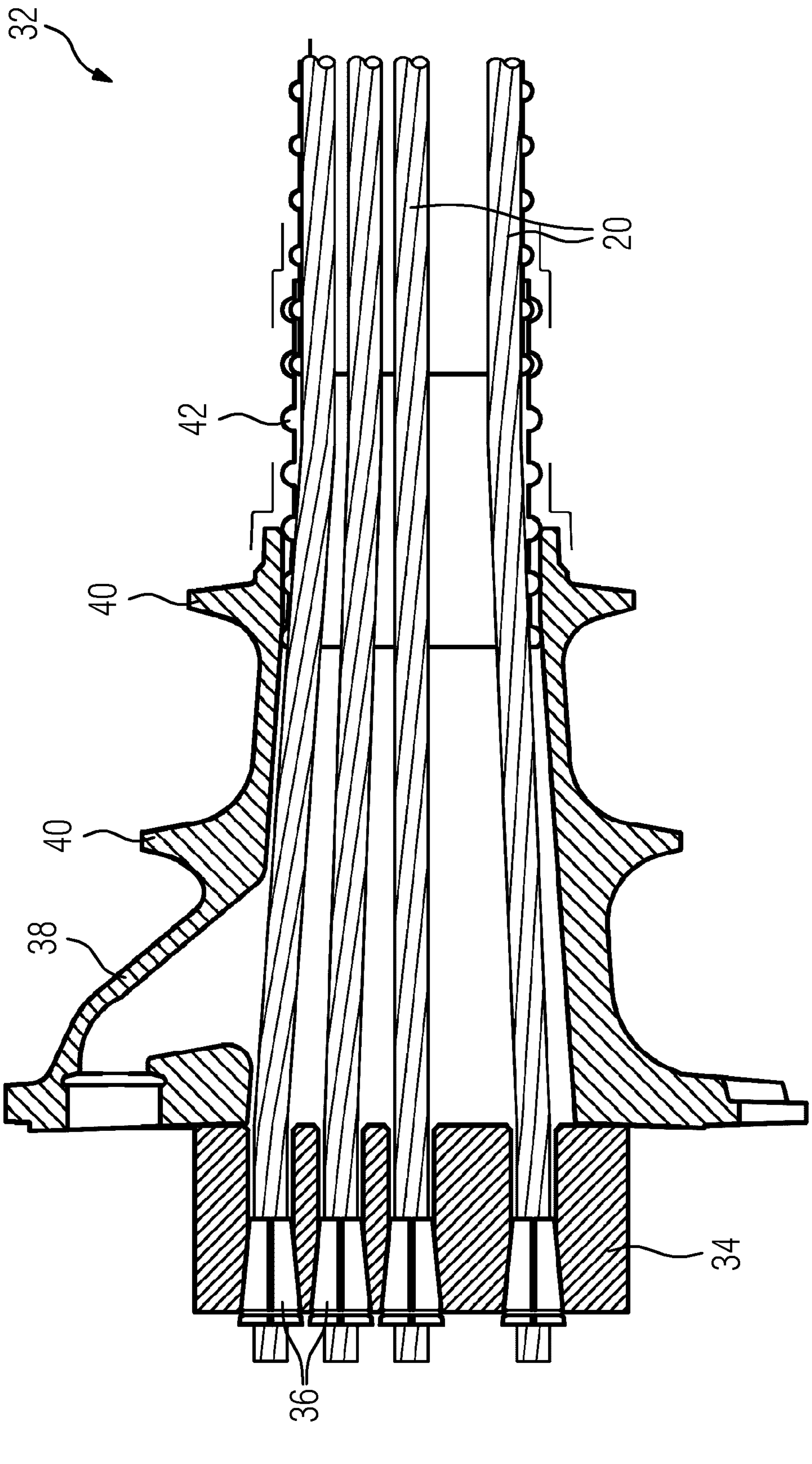

FIG. 5 shows an embodiment of a tensioning device 32 for a wire rope for a rack according to the invention. Such a tensioning device 32 is available, for example, from the manufacturer Freyssinet.

The tensioning device 32 has an anchor block 34, a plurality of clamping jaws 36 and possibly also a press-fit socket 38 and a guide 42. The clamping jaws 36 are formed as conical sleeves and each enclose a strand 20 of the wire rope. The anchor block 34 is in particular cylindrical in shape and has a plurality of conical bores which extend parallel to an axis of symmetry of the anchor block 34. The conical bores are provided for receiving the clamping jaws 36. The press-fit socket 38 surrounds the end portion of the wire rope and has a wide end and a narrow end. The narrow end of the press-fit socket 38 is arranged towards the channel 18. The wide end of the press-fit socket 38 is in force-fitting contact with the anchor block 34. The press-fit socket 38 has transverse ribs 40 which circumferentially surround the press-fit socket 38. In this example, the press-fit socket 38 has two transverse ribs 40. The guide 42 encloses another area of the wire rope. The narrow end of the press-fit socket 38 again encloses the guide 42. The guide 42 is formed as a transversely ribbed sleeve.

However, press-fit socket 38 and guide 42 can also be omitted, since the frame itself is made of steel and the anchor block 34 can also rest directly on a mating surface on the associated frame part. In addition, the anchor block 34 can also have a support surface adapted to the mating surface of the frame part, possibly also at an angle.

The tensioning device 32 is formed to be connected to the end of the wire rope and its strands and pressed into the end of the channel 18. Two tensioning devices 32 at the two ends of the wire rope allow sufficient pre-tensioning between the anvil bed 14 and the uprights 15 and 16.

There may be an active tensioning device 32 at one of the ends of the wire rope for tensioning the wire rope and a passive tensioning device 32 at the other end which only holds the wire rope at the end. Preferably, an active tensioning device 32 is provided at both ends of the wire rope.

The pretension can be adjusted in particular by actuating the tensioning device 32 mechanically by means of tools or by means of electric motor(s) or also by means of hydraulic actuators, and this can be done before commissioning, also in several steps, to a fixed value or also subsequently adjustable. For the actuation and adjustment of the tensioning devices 32, for example, a hydraulic or mechanical actuation device from STS Systems, which is known per se and which is not described in more detail here, can be used.

The use of the wire ropes 85 and 86 as pre-tensioning means enables a particularly high pretension between the anvil bed 14 and the respective upright 15 and 16. The wire ropes have a higher tensile strength than, for example, comparable tie rods. The wire ropes enable a very high tensile stress. The wire ropes ensure that the force-fitting connections between the anvil bed 14 and the uprights 15 and 16 remain closed during the impact. Furthermore, only a relatively small installation space is required for the bracing of the anvil bed 14 with the uprights 15 and 16 by means of the wire ropes. Despite the division of the frame, the precise ram guidance is not lost because the uprights do not jump or change their position or deform during the impact.

In order to reduce the internal stresses (e.g. notch stresses) on the recess 41 due to the pre-tensioning, in particular in the lower corner regions 78 and 79, these corner regions 78 and 79 are provided with roundings or radii and/or are spaced apart from the channel 18 and the tensioned wire rope in the channel by a minimum distance of in particular at least 80 mm, preferably at least 100 mm, as determined by the simulations.

The inward biases in the recesses 71 and 72 above the recess 41 are also reduced by their roundings.

By sufficiently spacing the separating surfaces or support surfaces of the support areas 65 and 66 from the anchor block 34 or the upper tensioning devices 32 at the wire rope ends, the best possible cone of force can be realised.

FIG. 6 shows another embodiment of a multi-part machine frame. A wire rope 87 connects both uprights 15 and 16 to the anvil bed 14. For this purpose, the wire rope 87 runs in an arcuate channel 18 from one rope end 87A, which is attached to one upright 15 with a tensioning device 32, to the other rope end 87B, which is attached to the other upright 16 with a tensioning device 32.

In a preferred embodiment, the wire rope ends, at least the upper wire rope ends, are each arranged in a receiving space 95 or 96 formed in the upright 15 or 16, preferably open towards the upright side surface 15A or 16A, as shown in FIG. 6, but also in FIGS. 7 to 9 and 11, and are clamped and pre-tensioned there by means of the tensioning device 32. The tensioning device 32 with the clamped strands of the wire rope end, in particular the anchor block 34, is placed or arranged on a base surface 97 or 98. The subchannel in the upright 15 or 16 opens into the receiving space at the respective base surface and the wire rope projects out of the subchannel into the receiving space or the tensioning device.

The channel 18 is composed of a subchannel 57 in the upright 15, which runs obliquely to the vertical and essentially straight inwards, an arcuate subchannel 47 in the anvil bed 14, which first runs downwards to a lowest point 47C and then upwards again, and a subchannel 58 in the upright 16, which runs obliquely to the vertical and essentially straight inwards. The subchannels 57 and 47 meet at the intermediate space 51 of the support area 65 and the subchannels 58 and 47 meet at the intermediate space 52 of the support area 66.

The support surfaces 45 and 55 or 46 and 56 are each inclined upwards to the horizontal in FIG. 4 and FIGS. 6 to 8. The outer support sub-areas 45 and 55 or 46 and 56 are inclined at an outer angle of inclination $\alpha$ to the subchannel 57 and thus to the direction of the tensile force in the wire rope guided therein, and the inner support sub-areas 45 and 55 or 46 and 56 are inclined at an inner angle of inclination $\beta$ to the subchannel 57.

In the embodiment shown in FIG. 10, only one of the two pairs of support surfaces, namely 45B and 55B, is inclined upwards and arranged at the inclination angle $\beta$ to the channel 53 and thus the tensile force in the wire rope. The other pair of support surfaces, namely 45A and 55A, is oriented horizontally and arranged at the angle of inclination $\beta$ to the channel 53 and thus the tensile force in the wire rope. Other orientations of the support surfaces than described here are also possible.

In all embodiments, the ratio of the inner inclination angle $\beta$ to the outer inclination angle $\alpha$ can generally be used to set the ratio of the contact pressure forces on the support surfaces as force components of the tensile force in the wire rope. In particular, the force component acting as a contact force on the respective support (sub-)area in the normal direction corresponds in terms of amount to the tensile force in the wire rope multiplied by the factor $\cos(90°-\alpha)$ or $\cos(90°-\beta)$. With equal inclination angles $\alpha=\beta$ the force distribution is equal or symmetrical, with unequal inclination angles $\alpha\neq\beta$ the force distribution is unequal or asymmetrical.

The inner inclination angle $\beta$ is preferably equal to or greater than the outer inclination angle $\alpha$. Preferably, the angles of inclination are chosen so that the contact force on the inner support (sub-)area caused by the wire rope is greater, for example by at least a factor of 2 greater, than the contact force on the outer support (part) surface, i.e. in particular $\cos(90°-\alpha)<\cos(90°-\beta)$ or $\cos(90°-\alpha)<2\cos(90°-\beta)$.

Preferred values for the inner inclination angle $\beta$ are selected from the interval of 60° to 100°, preferably about 90°, and for the outer inclination angle $\alpha$ are selected from the interval of 30° to 90°, preferably about 60°.

Figure 7:
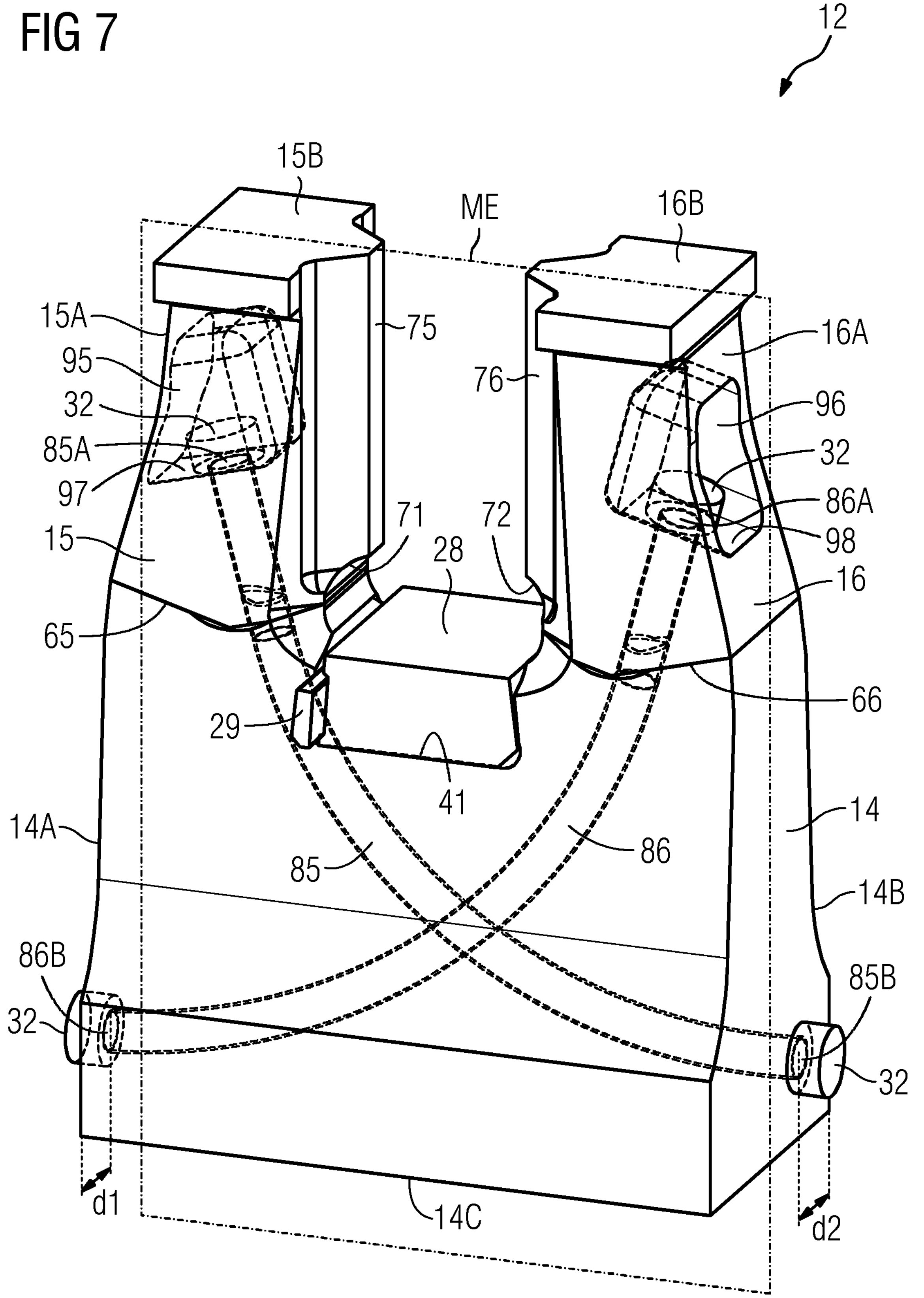

FIG. 7 shows a further embodiment in which two wire ropes 85 and 86 cross each other and run partially below the lower or second tool carrier 28, connecting opposite sides of the frame parts. The wire rope 85 terminates with its upper rope end 85A at the upright 15 in the region of its upright side surface 15A and is tensioned there with the tensioning device 32, preferably in a receiving space 95. The lower end 85B of the wire rope 85 is tensioned on the opposite anvil bed side surface 14B with the anvil bed 14 via a tensioning device 32. Similarly, the other wire rope 86 is tensioned at its upper end 86A on the upright 16 in the region of its upright side surface 16A with the tensioning device 32, preferably in the receiving space 96, and is tensioned with its lower end 86B on the opposite anvil bed side surface 14A with the anvil bed 14 via a tensioning device 32. The offset of the end 86B of the wire rope 86 from a centre plane ME of the frame 12 is denoted d1 and the offset of the end 85B of the wire rope 85 from the centre plane ME is denoted d2.

Figure 8:
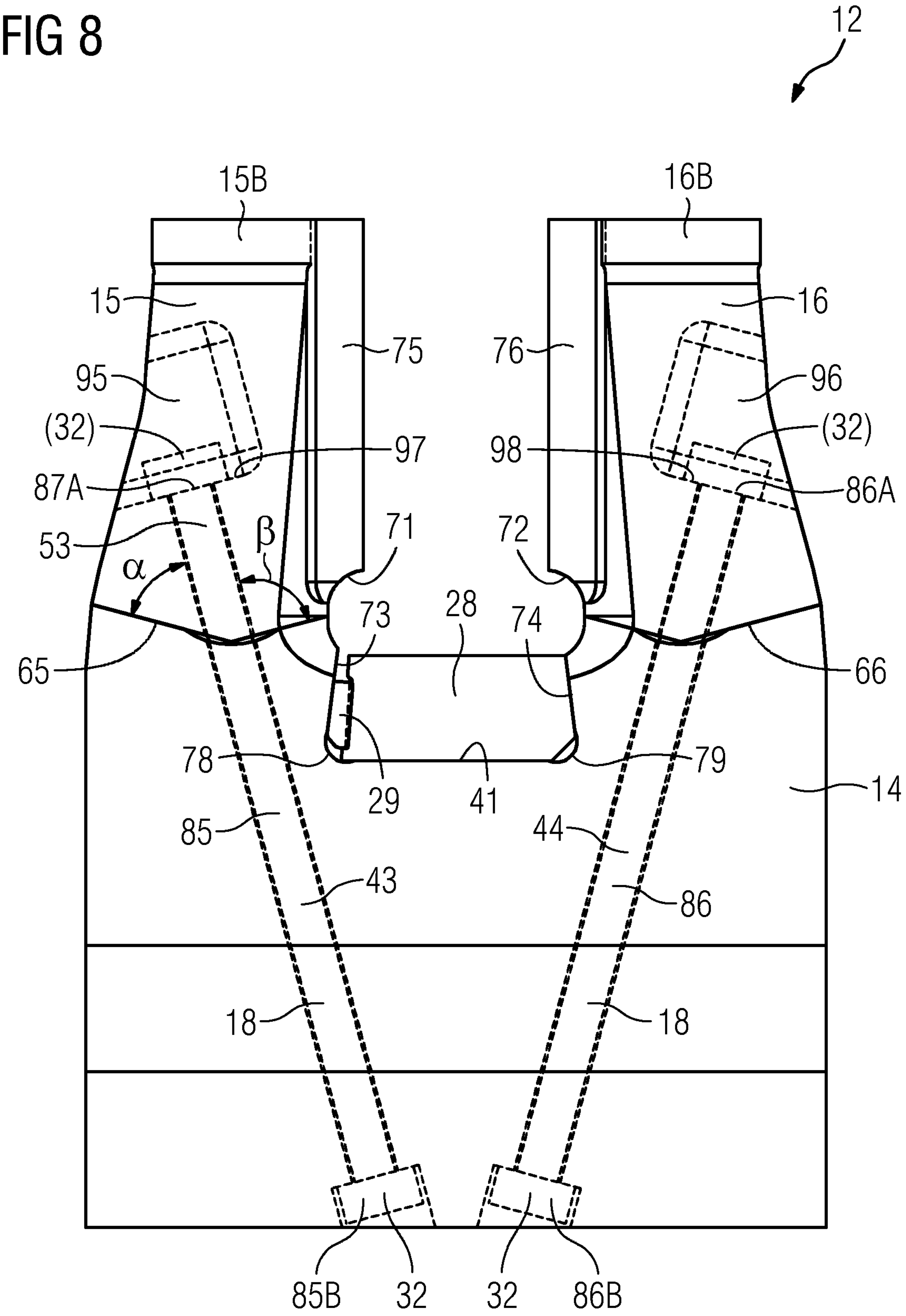

In FIG. 8 an embodiment is shown, in which the two channels 18 for the two wire ropes 85 and 86 run through the frame 12 in a straight line and at an angle, illustrated by the angles of inclination $\alpha$ and $\beta$. The subchannels 53 in the upright 15 and 43 in the anvil bed 14, which form the channel 18 for the wire rope 85, are thus arranged coaxially or in a straight line behind one another, as are the subchannels 54 and 44 of the channel 18 of the wire rope 86. The lower ends 85B and 86B of the wire ropes 85 and 86 are thus arranged closer to one another than the upper ends 85A and 86A.

Figure 9:
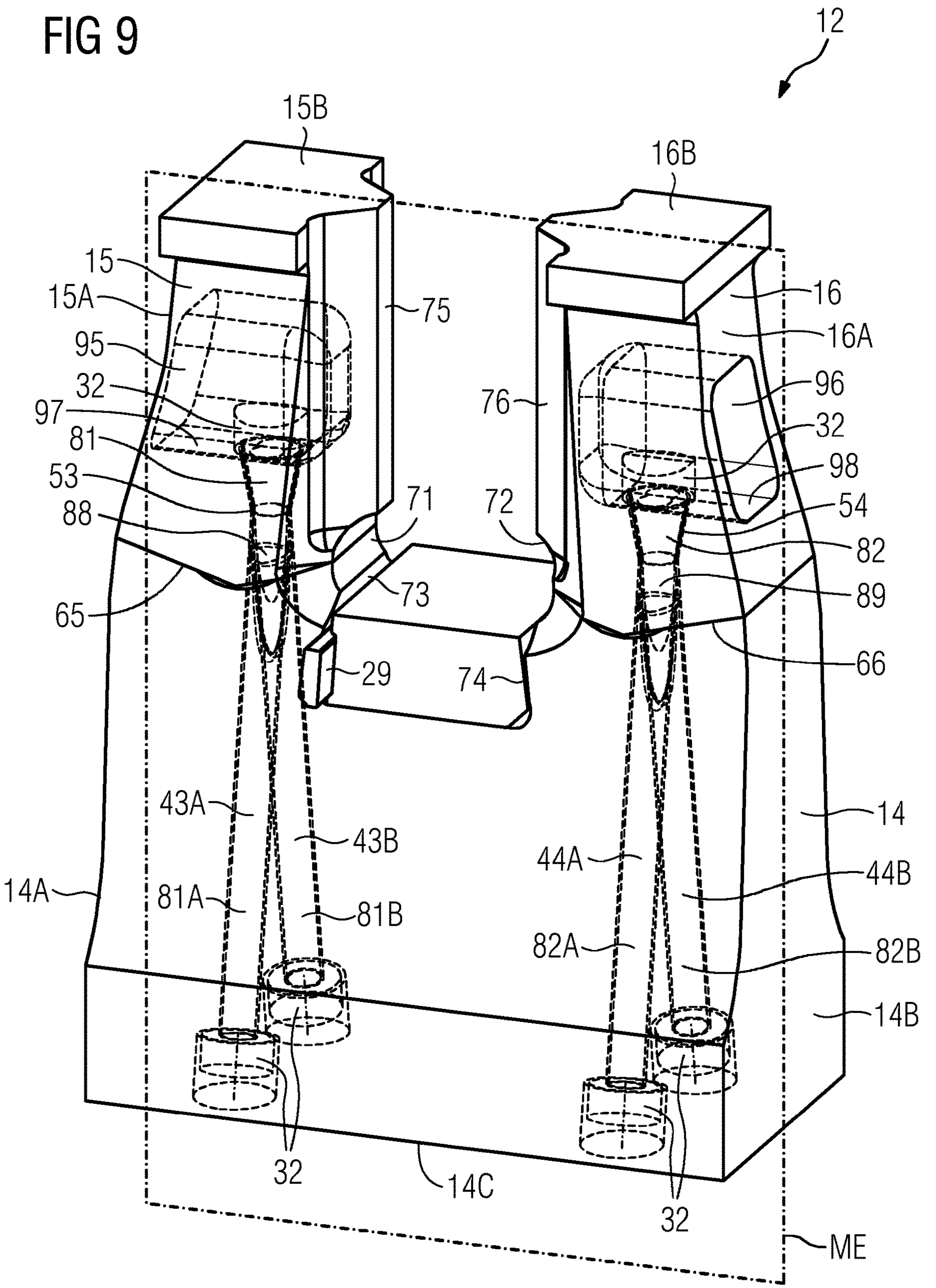

FIG. 9 now shows an example of an embodiment in which splitting or dividing a wire rope into at least two partial ropes takes place. A wire rope section 81 or 82 with a number of strands guided in a subchannel 53 or 54 is split in a splitter 88 or 89 into two partial ropes 81A and 81B each guided in a subchannel 43A or 43B or 44A or 44B with a divided reduced number of strands. This makes it possible to achieve a more uniform force load within the anvil bed 14.

In FIG. 10, an embodiment of the connection area or support area 65 is shown enlarged. Between outer support surfaces 45A and 55A and inner support surfaces 45B and 55B there are free surfaces 45C of the anvil bed 14 and 55C of the upright 15, between which the intermediate space 51 is formed. At the intermediate space 51, the subchannel 53 in the upright 15 ends from above and the subchannel 43 in the anvil bed 14 ends from below, so that the wire rope in the support area 65, which is not shown, passes through the intermediate space 51 at a distance from the support surfaces 45A and 55A and 45B and 55B, which are in contact. The outer support surfaces 45A and 55A here run horizontally and at an outer angle of inclination $\alpha$, preferably from the interval of 60° to 90°, to the subchannel 53. The inner support surfaces 45B and 55B again run obliquely upwards to the horizontal at an inner angle of inclination $\beta$, preferably from the interval of 60° to 90°, to the subchannel 53. The angles of inclination $\alpha$ and $\beta$ are here in particular equal.

In FIG. 11, an embodiment of the support area 66 between the upright 16 and the anvil bed 14 and a tensioned end 86A of a wire rope 86 is shown. A pair of external support surfaces 46A and 56A, arranged horizontally and at the external angle of inclination $\alpha$ to the wire rope 86, is here first joined by a pair of support surfaces 46C and 56C arranged steeply, preferably vertically or perpendicularly, which is thus directed at the angle of inclination $\gamma$ of close to or preferably equal to 90° to the horizontal, and prevents lateral outward movement of the upright 16. A shoulder or step-shaped support surface arrangement is thus implemented here. Downstream of the support surfaces 46C and 56C, the upright 16 and the anvil bed 14 form free surfaces 56D and 46D respectively, between which a gap 51 is again formed and which are inclined at an angle of inclination δ of typically 80° to 90° to the wire rope 86.

In the corner area adjoining the support surfaces 46C and 56C at the bottom, the clearance surfaces 46D and 56D are rounded and the gap 51 is widened to a rounding 51A to reduce notch stresses.

Likewise, in the upper corner area of the support surfaces 56C and 46C, a free surface 46F and thus an intermediate space is formed in order to avoid notch stresses there as well and, above all, to increase the contact pressure in the area 55B due to the overall smaller contact pressure surface.

On the other side of the wire rope 86, the free surfaces 46D and 56D are joined by the internal support surfaces 46B and 56B, which extend upwards at an angle to the horizontal and are again directed towards the wire rope 86 at the internal angle of inclination β.

The wire rope thus preferably runs in the support areas between the frame parts through an intermediate space or gap between the frame parts, which separates at least two pairs of support surfaces of the frame parts from each other. By means of the arrangement and inclination of the pairs of support surfaces relative to the direction of the tensile force in the wire rope or its channel in the support area, the respective contact force can be adjusted as a vectorial force component of the tensile force, i.e. in amount and direction, and thus the deformation of the frame parts determined by simulation or empirically can be specifically counteracted.

In the event of incorrect operation or improper use, such as excessive off-centre loading, the guides and the ram are not damaged but the uprights “give way” and return to their original position due to the special arrangement of the ropes and contact or support surfaces.

In all embodiments, the drive system 22 is preferably a hydraulic drive system and in particular comprises a hydraulic cylinder, for example a double-acting hydraulic cylinder or differential cylinder, with a piston provided for driving the ram 26 or ram 26 via a piston rod coupled to the piston. The drive system 22 further comprises a hydraulic circuit having hydraulic lines, valves, pumps, control units and/or regulating units necessary for operating the hydraulic cylinder.

Instead of two individual uprights, in all embodiments several individual uprights or also a connected upright part, which forms both uprights and the crossbeam in one piece, can be provided.

The frame 12 according to the invention is not limited to use in a forging hammer, but can also be used for other forming machines 10, in particular forging machines, for example forging presses such as screw presses or electric upsetting machines or also pressing machines or rolling machines or also sand-lime brick presses.

LIST OF REFERENCE SIGNS

10 forming machine
11 base
12 frame
13 foundation
14 anvil bed
14A, 14B anvil bed side surface
14C anvil bed underside
15, 16 upright
15A, 16A upright side surface
15B, 16B upright top
18 channel
20 wire strand
21 crossbeam
22 drive system
24 upper forming tool
26 ram
28 lower forming tool
29 wedge clamp
30 anvil
32 tensioning device
34 anchor block
36 clamping jaw
38 press-fit socket
40 transverse rib
41 recess
42 guide
43, 44 channel
43A, 43B subchannel
44A, 44B subchannel
45 support surface
45A, 45B support surface
45C free surface
46 support surface
46A, 46BA support surface
46C free surface
46F free surface
47 subchannel
47C lowest point
51, 52 intermediate space
52A rounding
53, 54 channel
55 support surface
55A, 55B support surface
55C free surface
56 support surface
56A, 56B support surface
56C free surface
57, 58 subchannel
65, 66 support area
67 feather key
71, 72 recess
73, 74 overhang
75, 76 guide
77 control system
78, 79 rounded corner areas
81, 82 wire rope
81A, 81B partial rope
82A, 82B partial rope
85, 86 wire rope
85A,85B rope end
86A,86B rope end
87 wire rope
87A, 87B rope end
88, 89 splitter
95, 96 receiving room
97, 98 clamping surface
ME centre plane
α, β angle of inclination
d1, d2 distance

We claim:

1. A multi-part machine frame for a forging machine for forging workpieces, a) comprising at least two prefabricated frame parts which are formed separately from each other, bear against each other in at least one or more support area(s) and are mutually supported and are pretensioned against each other with a set or adjustable pretension by means of pre-tensioning means, and are thereby pressed onto each other in the one or more support area(s) or are connected to one another in a force-fitting manner, b) wherein in the one or more support area(s) between the at least two prefabricated frame parts at least two pairs of abutting support surfaces are formed, which are separated by free surfaces arranged therebetween, between which an intermediate space is formed, c) wherein the one or more support area(s) or the at least two pairs of abutting support surfaces in the one or more support area(s) constitute or act as a positive and/or self-positioning connection, d) wherein the at least two pairs of abutting support surfaces in the one or more support area(s) are flat surfaces and form at least part of a polyhedron, the polyhedron comprising at least in part of: (i) a pyramid or a truncated pyramid, or (ii) a prism.

2. The multi-part machine frame according to claim 1, wherein the at least one pre-tensioning means associated with the at least two prefabricated frame parts extends:

through the intermediate space formed between the free surfaces and spaced from the pairs of abutting support surfaces, or between the two pairs of support surfaces along a tensile force direction or prestressing direction.

3. The multi-part machine frame according to claim 1, wherein the one or more support area(s) or the at least two pairs of abutting support surfaces in the one or more support area(s) constitute or effect:

a non-self-locking connection or a double wedge tension or wherein a fixing with a respective feather key is provided at each support area.

4. The multi-part machine frame according to claim 1, wherein:

the at least two pairs of abutting support surfaces are each inclined upwardly with respect to a horizontal, or one pair of support surfaces of the at least two pairs of abutting support surfaces is arranged horizontally and the other pair of support surfaces of the at least two pairs of abutting support surfaces is inclined upwardly with respect to a horizontal.

5. The multi-part machine frame according to claim 1, wherein:

a third or further pair of support surfaces, which is arranged in between the free surfaces or the intermediate space and another, of the at least two pairs of abutting support surfaces, is provided and is oriented vertically or perpendicularly, a free surface or an intermediate space being formed in at least one corner region or transition region of the third pair of support surfaces.

6. The multi-part machine frame according to claim 1, wherein the pre-tensioning means comprise at least one wire rope, wherein:

a tensile stress in the at least one wire rope is set to at least 600 N/mm2 or at least 800 N/mm2 or at least 1000 N/mm2 or wherein a tensile force in the each at least one wire rope is set between 2 MN and 15 MN, and/or each wire rope is formed according to a standard EN 12385 or comprises a predetermined number of 3 to 80 of strands which are twisted together around a central core or in a helical form.

7. The multi-part machine frame according to claim 6, wherein:

the at least one wire rope is guided in at least one continuous channel in the machine frame, wherein the at least one continuous channel and the at least one wire rope guided therein runs only through two frame parts of the at least two prefabricated frame parts;

or at least one continuous channel and the at least one wire rope guided therein runs through three frame parts of the at least two prefabricated frame parts.

8. The multi-part machine frame according to claim 7, wherein:

the at least two prefabricated frame parts each have at least one subchannel, at least one subchannel of a first frame part of the at least two prefabricated frame parts being connected in each case to at least one subchannel of a second frame part of the at least two prefabricated frame parts forming an interconnected subchannel, and the at least one continuous channel for the wire rope being formed from the interconnected subchannel, and a subchannel either U-shaped or curved, in the frame part is connected at its two ends to a respective subchannel of a respective further frame part and forms with these two subchannels the at least one continuous channel for a wire rope and runs partially below a recess for a forming tool.

9. The multi-part machine frame according to claim 7, wherein the continuous channels or subchannels of two different wire ropes cross within a frame part, partially below a recess for a forming tool, and/or run from one side of the frame to an opposite side of the frame or in which the subchannels are arranged in a straight line to each other or form a straight continuous channel and/or run vertically or inclined to the vertical.

10. The multi-part machine frame according to claim 6, having any one of the following features:

a) a frame base and at least one, two, or four separately formed uprights extending substantially upwards from the frame base are provided as separate frame parts, b) an U-shaped, inner channel in the base of the frame is connected at its two ends to a respective inner channel in one or two uprights and forms a continuous channel and the ends of the wire rope guided in this continuous channel lie in each case on or in the at least one, two, or four separately formed uprights, or c) at least two inner channels in the frame base form a continuous channel with an inner channel in one or two uprights of the at least one, two, or four separately formed uprights, and optionally in a crossbeam, and the ends of the wire rope guided in this continuous channel each lie at or in the frame base.

11. The multi-part machine frame according to claim 6, wherein:

a) the pre-tensioning of the at least two prefabricated frame parts against one another in the one or more support area(s) results in amount and direction from the tensile stress in an associated wire rope of the at least one wire rope and its course or a course of an interconnected channel and a vertical tensile stress component and a horizontal tensile stress component resulting therefrom, wherein a ratio of the horizontal tensile stress component and the vertical tensile stress component in the associated wire rope over its course lies in a range of 0% to 80% and in the one or more support area(s) between 0% and 50% and/or b) the at least one wire rope or an at least one continuous channel for the at least one wire rope runs substantially vertically at least in the one or more support area(s) and/or at least one wire rope or the at least one continuous channel for the at least one wire rope runs at an angle (α) or obliquely to a vertical at least in the one or more support area(s).

12. The multi-part machine frame according to claim 6, wherein:

the pre-tensioning means comprise at least one tensioning device at each of the at least one wire rope, in particular a rope end thereof, for tensioning and generating the tensile stress in the at least one wire rope, the tensioning device enclosing an associated wire rope of the at least one wire rope and is clamped, locked or brought into force-fitting contact with the frame part at a corresponding end of an at least one continuous channel, wherein an outwardly open receiving space is provided in the frame part for receiving the at least one wire rope end and the tensioning device, the tensioning device comprises an anchor block and a plurality of clamping jaws, wherein the clamping jaws are formed as conical sleeves and each enclose a strand of the at least one wire rope, and wherein the anchor block has a plurality of parallel conical bores for receiving the clamping jaws and/or wherein the tensioning device has a press-fit socket with a wide end and a narrow end, wherein the narrow end of the press-fit socket is arranged towards the channel and the wide end of the press-fit socket is in force-fitting contact with the anchor block, and wherein the press-fit socket has transverse ribs which surround the press-fit socket in a circumferential direction.

13. A multi-part machine frame for a forging machine for forging workpieces, a) comprising at least two prefabricated frame parts which are formed separately from each other, bear against each other in one or more support area(s) and are mutually supported and are pretensioned against each other with a set or adjustable pretension by means of pre-tensioning means, and are thereby pressed onto each other in the one or more support area(s) or are connected to one another in a force-fitting manner, b) wherein in the one or more support area(s) or at least one of the one or more support area(s) between the at least two prefabricated frame parts at least two pairs of abutting support surfaces are formed, which are separated by free surfaces arranged therebetween, between which an intermediate space is formed, c) wherein the one or more support area(s) or the at least two pairs of support surfaces in the one or more support area(s) constitute or act as a positive and/or self-positioning connection, d) wherein the at least two pairs of abutting support surfaces in the at least one support area(s) are complementary to one another, wherein a projecting or convex arrangement of a first pair of support surfaces of the at least two pairs of abutting support surfaces is opposite a receding or concave second pair of support surfaces of the at least two pairs of abutting support surfaces.

14. A multi-part machine frame for a forging machine for forging workpieces, a) comprising at least two prefabricated frame parts which are formed separately from each other, bear against each other in one or more support area(s) and are mutually supported and are pretensioned against each other with a set or adjustable pretension by means of pre-tensioning means, and are thereby pressed onto each other in the one or more support area(s) or are connected to one another in a force-fitting manner, b) wherein in the one or more support area(s) between the two frame parts at least two pairs of abutting support surfaces are formed, which are separated by free surfaces arranged therebetween, between which an intermediate space is formed, c) wherein the one or more support area(s) or the at least two pairs of support surfaces in the one or more support area(s) constitute or act as a positive or self-positioning connection, d) wherein an outer pair of support surfaces of the at least two pairs of support surfaces is inclined at an outer inclination angle (α) to the pre-tensioning means or a direction of tensile force in the pre-tensioning means and an inner pair of support surfaces of the at least two pairs of support surfaces is inclined at an inner inclination angle (β) to the pre-tensioning means or the direction of tensile force in the pre-tensioning means wherein:

a force component acting as a contact force on the at least two pairs of support surfaces in a normal direction corresponds in amount to the tensile force multiplied by a factor cosine of 90° minus a corresponding angle of inclination (α, β), and the inner inclination angle (β) is selected to be equal to or greater than the outer inclination angle (α), and the inner inclination angle (β) is selected from an interval of 60° to 100° and the outer inclination angle (α) is selected from an interval of 30° to 90°.

* * * * *